United States Patent [19]

Szczepanek et al.

[11] Patent Number: 5,404,450
[45] Date of Patent: Apr. 4, 1995

[54] COMMUNICATIONS PROCESSOR SYSTEM WITH CONTROL OF DOWNLOADED TASKS

[75] Inventors: Andre Szczepanek, Bedford, England; Denis R. Beaudoin, Missouri City, Tex.

[73] Assignee: Texas Instruments Incorporated

[21] Appl. No.: 24,893

[22] Filed: Mar. 1, 1993

Related U.S. Application Data

[63] Continuation of Ser. No. 445,066, Dec. 4, 1989, abandoned.

[51] Int. Cl.⁶ .............................................. G06F 15/16
[52] U.S. Cl. ...................................... 395/200; 395/325
[58] Field of Search ............................... 395/325, 200

[56] References Cited

U.S. PATENT DOCUMENTS

| | | | |
|---|---|---|---|
| 4,298,934 | 11/1981 | Fischer | 364/200 |
| 4,488,226 | 12/1984 | Wagner et al. | 364/200 |
| 4,562,539 | 12/1985 | Vince | 364/200 |
| 4,837,677 | 6/1989 | Burrus, Jr. et al. | 364/200 |
| 5,249,266 | 9/1993 | Dye et al. | 395/162 |

*Primary Examiner*—Thomas G. Black
*Assistant Examiner*—Peter Y. Wang
*Attorney, Agent, or Firm*—Robert D. Marshall, Jr.; James C. Kesterson; Richard L. Donaldson

[57] ABSTRACT

A communications processor system 10b that permits communications task code to be safely downloaded from a host system. Direct access to local memory 15b of the communications processor system 10b is permitted only during a downloading process while system 10b in a reset state. This downloading process is implemented with a special control register. In user mode, the system 10b controls access to local memory 15b by downloaded task code. Specifically, access is prohibited with respect to privileged memory areas, and is limited to a relatively small predetermined range of addresses with respect to other memory areas. This memory protection process is implemented with a special status register and a number of mapping registers.

14 Claims, 12 Drawing Sheets

```
                                          |  Detected by  |
                                          |  MIF as data  |
                                          |    window     |
                                          |<------------->|
CP's word address     --->   O O O O 1 1 O h i j k l m n o p q r s t . . . . . . . . . . . . .
output on internal                                                    . . . . . . . . . . . . .
address bus.                                                          . . . . . . . . . . . . .
                                                                      . . . . . . . . . . . . .
                                       |    7 bit      |              . . . . . . . . . . . . .
                                       |  value for    |              . . . . . . . . . . . . .
                                       | substitution  |              . . . . . . . . . . . . .
                                       |<------------->|              . . . . . . . . . . . . .
                             +-+-+-+-+-+-+-+-+-+-+-+-+-+-+-+-+-+-+-+-+
DATA|MAP                     |0|0|0|0|0|a|b|c|d|e|f|g|0|0|0|0|0|0|0|0|
register                     +-+-+-+-+-+-+-+-+-+-+-+-+-+-+-+-+-+-+-+-+
                                                                      . . . . . . . . . . . . .
                                         . . . . . . . . a b c d e f g h i j k l m n o p q r s t
                                                         |<--------------------------------->|
                                                           Resultant 20 bit memory address Figure 6b
```

```
                                    | Detected by MIF |
                                    | as STACK window |
                                    |<---------------->|
CP's word address    --->            0 0 0 0 1 1 1 1 0 k l m n o p q r s t
output on internal
address bus.
                                        | 10 bit value for |
                                        | substitution     |
                                        |<---------------->|
                     +-+-+-+-+-+-+-+-+-+-+-+-+-+-+-+-+-+-+-+-+
STACKMAP             |0|0|0|0|0|0|0|a|b|c|d|e|f|g|h|i|j|0|
register             +-+-+-+-+-+-+-+-+-+-+-+-+-+-+-+-+-+-+-+-+

. . . . . . . a b c d e f g h i j k l m n o p q r s t
                     |<---------------------------------------------------->|
                              Resultant 20 bit memory address
```

Figure 6e

COMMUNICATIONS PROCESSOR SYSTEM WITH CONTROL OF DOWNLOADED TASKS

CROSS REFERENCE TO RELATED APPLICATIONS

This application is a continuation of application Ser. No. 07/445,066, filed Dec. 4, 1989, entitled "Communications Processor System with Control of Downloaded Tasks" by Andre Szczepanek and Denis R. Beaudoin, now abandoned.

TECHNICAL FIELD OF THE INVENTION

This invention generally relates to computer network systems, and more particularly to a communications processor system that controls downloaded communications tasks so that they do not endanger the integrity of the system.

BACKGROUND OF THE INVENTION

In computer communications systems such as local area networks, local network controllers, which implement low level communications tasks, are being replaced by intelligent local processors. In general, these processors are used to off-load a greater number of communications tasks from a host system. The use of such communications processors has led to the development of communication processor systems, in which a communications processor accesses its own local memory. This local memory contains software programs for various communications tasks. Typically, these software programs follow certain recognized protocols, which are consistent with the widely accepted model established by the International Standards Organization (ISO).

In some such communications processor systems, the communications processor interfaces with a network controller on one side and with a host processor on the other side. A problem with such systems is the overhead involved in having communications tasks split between the controller and the communications processor.

In other communications processor systems, the communications processor is permanently configured for executing lower level protocol tasks, such as those that provide physical level services. Additional processing capability is provided by permitting higher level tasks, such as those that provide data link services, to be downloaded to local memory. A potential problem with downloadable communication processor systems is that they are susceptible to downloading of "unfriendly" code. For example, computer viruses and worms can propagate copies of themselves among all nodes of a network. Another example is when task code for a communications task, not designed to share common processor and memory resources with other task code, interferes with execution of that other code. In both situations, the result is unauthorized access to memory of the system, which can disrupt the entire communications system. In peer-to-peer and client-server networks, the susceptibility of a network to undesired code is exacerbated by the open architecture of some node host processors.

Thus, a need exists for a communications processor system that accepts downloaded communications tasks, but that prevents unfriendly communications task code from disrupting the network.

SUMMARY OF THE INVENTION

The various aspects of the invention involves a communications processor system that controls downloaded communications tasks. Special registers are used to protect the system from downloaded communications task code that may request unauthorized control of the system processor or unauthorized access to the system's local memory.

Thus, in one apparatus aspect of the invention, the communications processor system has a host accessible control register, which has a reset input and control inputs that control the communications processor. The reset input creates an interlock to the control inputs. For example, one of the control inputs may be a processor halt control, which is interlocked by reset input so that the halt can be enabled only during reset. The reset interlocking permits downloading from the host without making the system vulnerable to unauthorized control of the communications processor.

In another apparatus aspect of the invention, the communications processor system controls memory access by downloaded communications task code. A status register enables a user mode that protects privileged code and essential data. All memory access to unprivileged code and nonessential data is via a number of window mapping registers, which translate limited virtual addresses to extended real addresses.

One method aspect of the invention involves downloading code from a host system to the communications processor system. A reset control process permits downloading under host control only while the communications processor system is in a reset state. Furthermore, the reset control process ensures that certain controls to the processor of the communications processor system may be enabled only during this reset state.

Another method aspect of the invention is a memory management process that controls access by a downloaded user task to local memory. A user mode prohibits access to memory containing privileged code and essential data and limits access to other memory by means of a window memory mapping process.

A technical advantage of the invention is the elimination of the risk of downloading "unfriendly" communications task code that could disrupt the operation of a communications system. A single node implemented in accordance with the invention can safely execute communications tasks following different protocols. Furthermore, in a network having a number of nodes, each implemented in accordance with the invention, the same communications task may be safely downloaded to all nodes. This protection is implemented with hardware and with operating system software, such that no special programming of the communications tasks is required.

DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

FIGS. 6a–6g illustrate the address translation performed with the mapping registers of FIG. 4.

DETAILED DESCRIPTION OF THE INVENTION

For purposes of this description, a "communications protocol" is any one of the hardware and software rules by which communications take place in a computer network. Protocols are often conceptualized as a hierarchy of functional levels, i.e., a "protocol stack". A "user task" is a software service associated with a layer or sublayer of a protocol stack, and is programmed with "user task code", or "task code".

Figure 1:
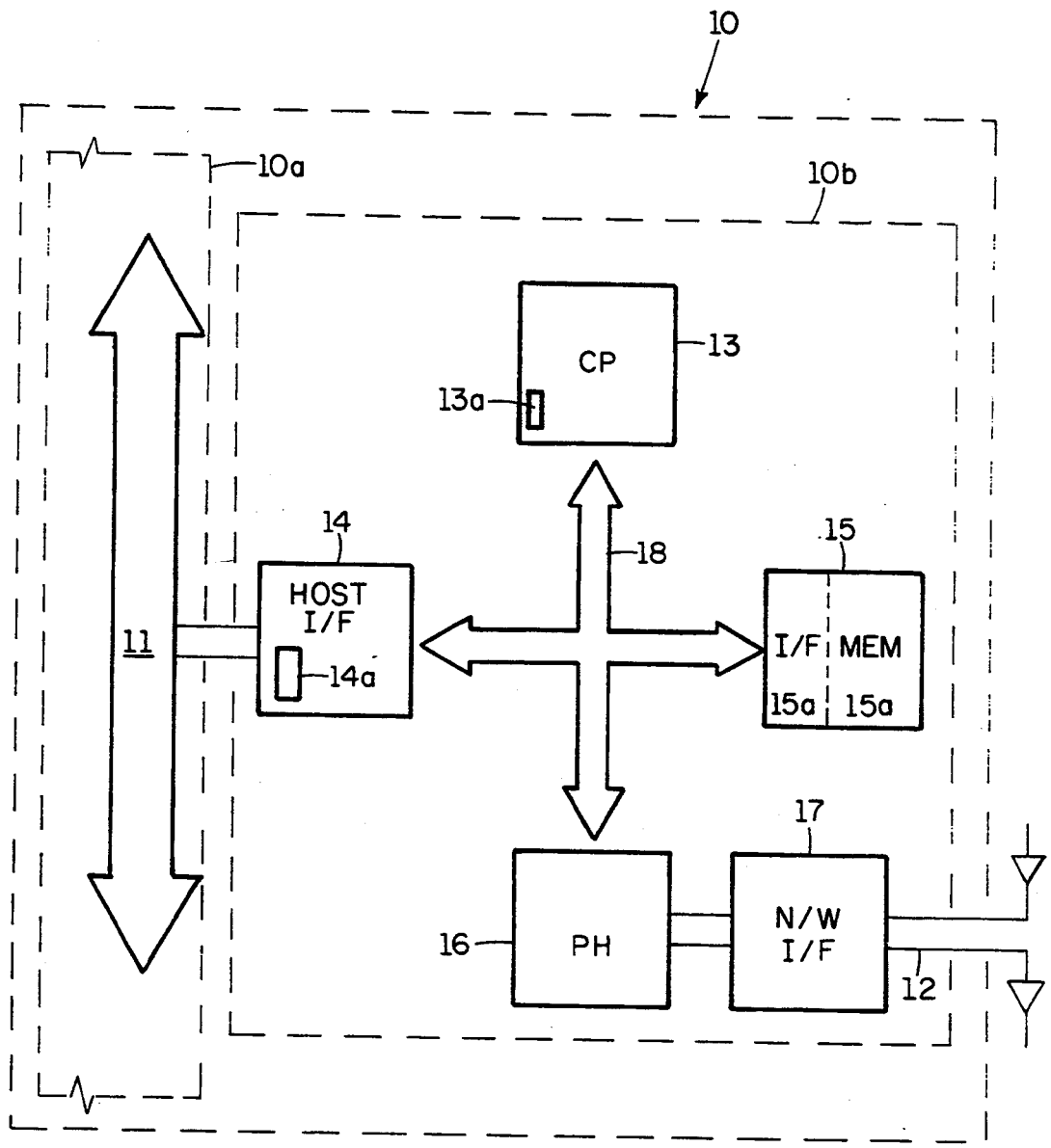
FIG. 1 is a block diagram of a node of a communications system.

FIG. 1 is a block diagram of a node 10 of a communications network, with which the invention is used. The network of FIG. 1 is a local area network (LAN), although the basic concept of the invention is applicable to any type of computer network.

Node 10 is comprised of a host processor system 10a and a communications processor system 10b. Communications system 10b is referred to herein as an "adapter" 10b. Adapter 10b is in communication with a bus 11, which connects adapter 10b to host processor system 10a. Because one of the advantages of the invention is the off-loading of communications tasks from host system 10a, it is assumed that host system 10a has its own processor, typically a general purpose processor such as the Intel 80** family of processors.

The overall operating organization of node 10 is that of separate executives for the host system 10a and adapter 10b, such that each system has its own operating system. In fact, a premise of the invention is that adapter 10b has its own operating system, which controls the resources of adapter 10b. Access to these resources is granted to user tasks by operating service requests. Thus, the operating system of adapter 10b performs usual operating system tasks, such as servicing interrupts from physical devices, scheduling and dispatching user tasks, and managing timers. Additionally, in connection with various aspects of the invention, the operating system performs certain other tasks. More specifically, as explained below in connection with FIG. 2, the operating system performs certain loading tasks, and as explained in connection with FIGS. 3–6, the operating system also recognizes a user mode and performs a window memory mapping process.

Adaptor 10b is in communication with the network via one of a number of access schemes via a physical link 12. This physical link may be that of any one of a number of various token passing or contention schemes. If different schemes are used, appropriate changes are made to network interface 17, and, as discussed below, to protocol handler 16.

A feature of the invention is that different communications tasks, which may each follow a different protocol, i.e., have "incompatible" user code, may be executed on adapter 10b. The operating environment of adapter 10b is therefore a multiprogramming environment, in which only one instruction is executed at a time, but in which a number of tasks may appear to be simultaneously executing. As each task is dispatched, the operating system sets the context, in particular by loading mapping registers associated with that task, as explained below in connection with FIGS. 3–6. Protection of the system from unauthorized accesses by these user tasks is a accomplished by the control devices that are the subject of this invention.

Adapter 10a has a number of basic components: communications processor 13, host interface 14, local memory 15, protocol handler 16, and network interface 17. An adapter bus 18 provides communications among these components. An example of an adapter system having these components is the TMS380 chip set manufactured by Texas Instruments, Inc.

Communications processor 13 is essentially a CPU. Ideally, communications processor 13 is designed for suitability to communications tasks, such as the ability to handle quick and frequent interrupts. A special status register 13a of communications processor 13 limits the access by task code to memory when that code is being executed. This status register 13a is explained below in connection with FIGS. 3–6.

Communications processor 13 has memory addressing features that are important to the invention. Specifically, the address range of communications processor 13 is limited to N bytes of memory, which is divided into two N/2 chapters. For example, where N=128 Kbytes, each chapter has 64 Kbytes of space. One of these chapters is addressed during code fetches, such as opcodes and immediate operands. The other chapter is addressed during data reads or writes. Both chapters have virtual addresses, from which communications processor 13 operates. The following description is consistent with a 128 Kbyte virtual memory, but it should be understood that this is for purposes of illustration only. As explained below in connection with FIGS. 3–6, a window memory mapping process maps certain of the virtual addresses to extended real memory space.

Host interface 14 provides an interface to a CPU and bus of the attached system, i.e., host system 10a. Memory transfer between host system 14a and adapter 10b is provided by direct I/O (DIO) and direct memory access (DMA). The DIO is used to initialize adapter 10b and provide handshaking between host system 10a and adapter 10b. Host interface 14 has a number of registers, which are accessible by DIO, and which include a control register 14a discussed below in connection with FIG. 2. The DMA is used for message transfers, including commands and frame data. The DMA allows adapter 10b to gain control of bus 11 and provide address and data for transfer to and from memory of the host system 10a. Implementation of interface 14 may also require a bus interface logic component.

Memory 15 is comprised of an interface 15a and memory space 15b. Memory interface 15a accesses a number of mapping registers, which are explained below in connection with FIG. 4. Preferably, memory interface 15a has memory expansion logic that permits a direct connect to memory 15b. Memory 15b may be comprised of a mixture of PROM, EPROM, SRAM, and DRAM, but for purposes of this description is assumed to be DRAM. Memory 15b may be any size, but for purposes of this description, has a 2 Mbyte address size.

In general, memory 15 is configured for a window memory mapping process, which is discussed below in connection with FIGS. 3–6, which maps the virtual address range of communications processor 13 to a real address. Additional hardware aspects of memory 15 and its registers are described in copending U.S. patent application Ser. No. 07/446,019, entitled "Data Communications System" assigned to Texas Instruments, Inc., filed Dec. 5, 1989, now pending.

Protocol handler 16 handles the transmission and receipt of frame data. All frame data is contained in one or more buffers, which are serially linked in RAM. Protocol handler 16 is configured for the lower levels of at least one protocol. As stated above, an advantage of the invention is that user tasks using different protocols may be downloaded to adapter 10b. If this is the case, protocol handler 16 is configured for the corresponding protocol. This may be accomplished with a hardwired configuration of protocol handler 16.

The services handled by protocol handler 16 include the physical link layer services and some of the medium access control layer services. Typically, protocol handler 16 will conform to a standard such as the IEEE 802.5, but any protocol may be used. The essential feature of protocol handler 16 is the ability to remove bits from the network 12 and put frames in local memory 15b.

Network interface 17, in the case of a token ring system, provides access to the ring. In the case of other network physical layouts, interface 17 is modified accordingly.

Adapter bus 18 interfaces the various components of adapter 10b. It provides the usual functions of an internal bus, such as moving data to and from internal devices and memory.

Control Register

As stated above, one aspect of the invention is a control register 14a, which is part of host interface 14. The basic function of control register 14a is to provide a reset state that permits certain adapter 10b controls to be set only in the reset state.

More specifically, when adapter 10b is in a reset state, node 10 is off the network by default, and host system 10a may change certain control inputs to adapter 10b. When adapter 10b is not in a reset state, host system 10a loses control of this function. Thus, once communications processor 13 is executing, these control inputs cannot adversely affect communications processor 13. For example, as explained below, control register 14a ensures that a Communications Processor Halt control is enabled only in the reset state and when node 10 is off the network.

The overall number of control bits handled by control register 14a may vary, but it includes at least these bits:

Bit 0: Reset
  When this bit is set to one, communications processor 13 is reset, and is held in a reset condition for as long as the bit remains at one. The bit can be read to or written from.
Bit 1: Communications Processor Halt
  It is necessary to prevent communications processor 13 from attempting to execute code until the code has been downloaded from host system 10a. This is achieved by setting Bit 1 to one, which prevents communications processor 13 from being granted access to adapter bus 18.
  When Bit 0 is one, Bit 1 can be written with one or zero. After Bit 0 has been set to zero, Bit 1 can only be set to zero. Writing a one will have no effect. Bit 1 can be read at any time.

In the following description, setting a bit to one is referred to as "setting" the bit, whereas setting a bit to zero is referred to as "clearing" the bit. The Communications Processor Halt bit is only one example of a control input that can be interlocked by control register 14a.

Figure 2:
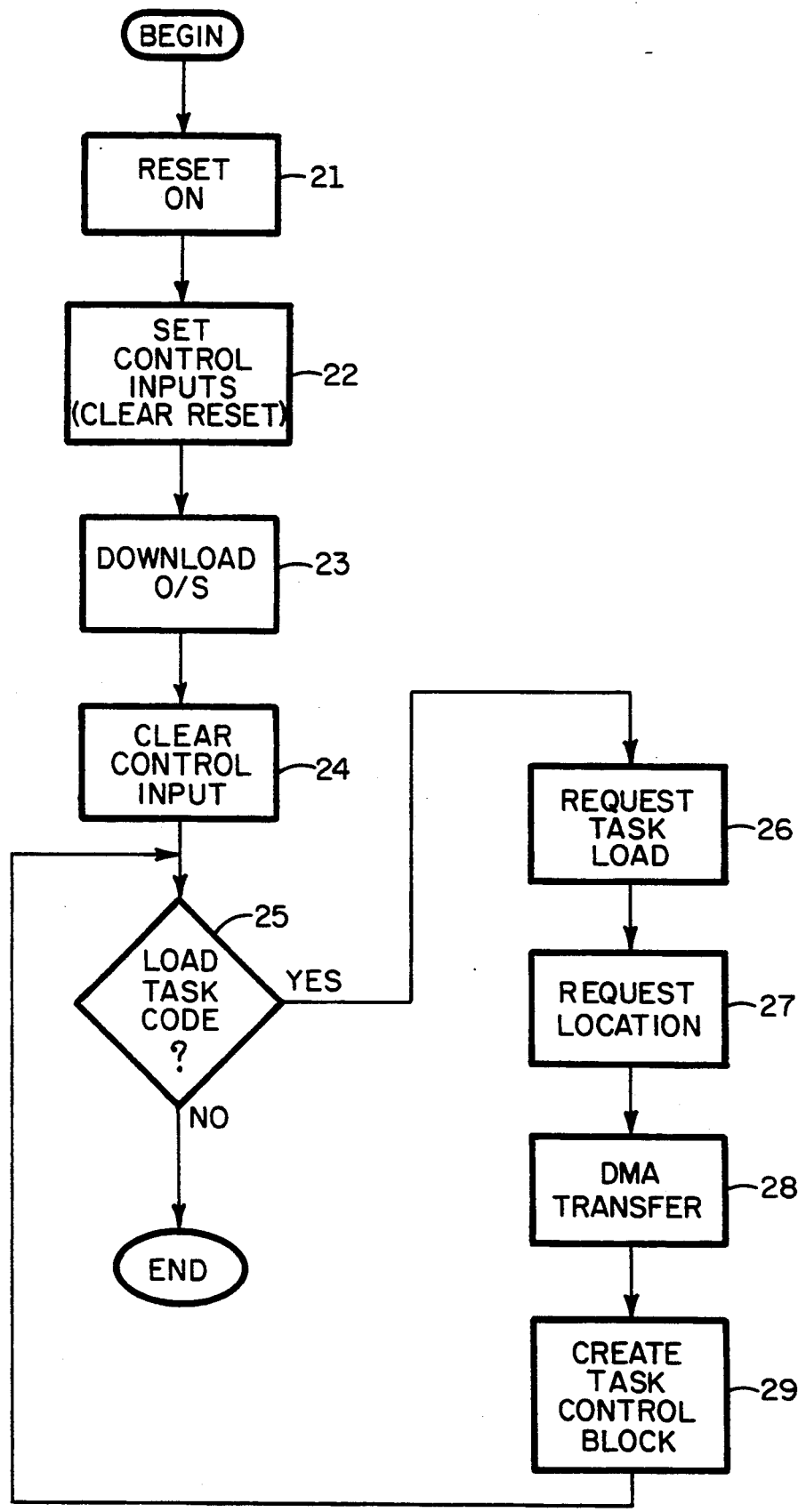
FIG. 2 is a process flow diagram of the configuration control process implemented by the control register shown in FIG. 1.

FIG. 2 illustrates one of the method aspects of the invention: a downloading process that uses control register 14a. This process is initiated with software executed by host system 10a, but is primarily performed by the operating system of communications processor 13.

As shown in FIG. 2, step 21 is placing adapter 10b in a reset state. At this time, because the Reset bit is set, control inputs to communications processor 13, such as the Communications Processor Halt Bit described above, may be changed.

Step 22 is setting the control bits. Additional protection is provided by requiring the Reset bit to be cleared in direct response to setting the control bits. Once Reset is cleared, the control bits can be cleared but not set.

Step 23 is downloading the operating system to adapter 10b. For this step, Communications Processor Halt is set. The downloading is a DIO memory access, in which host system 10a supplies an address to adapter 10b, which host system 10a will modify.

Step 24 occurs after the operating system has been downloaded, and comprises clearing the control bits.

In step 25, the operating system of adapter 10b determines whether task code is to be downloaded to adapter 10b. If so, the user task requests the download and a location, as indicated by steps 26 and 27. The loading is via a communications area set up in memory of host processor system 10a.

Step 28 is downloading the task code via direct memory access (DMA) via the operating system of adapter 10b. In contrast to the DIO used to download the operating system, in DMA adapter 10b supplies an address of host system 10a, which adapter 10b will modify.

In step 29, the operating system creates a task control block for the downloaded task code. This task control block is similar in function to memory control blocks of operating systems in general, and identifies the task code memory. The task control block contains a list of real addresses, with each real address represented by a page pointer. The task control block is used for the memory management aspects of the invention, as explained below in connection with FIGS. 3-6.

As indicated by steps 21-24, and using the Communications Processor Halt control input as an example, adapter 10b must be in a reset state, as directed by the host, to set the Halt control input. When the reset state is cleared, an interlock prevents the Halt control input from being set, although it may be cleared. The Halt control prevents communications processor 13 from accessing memory during DIO. The reset interlock protects communications processor 13 from being halted by user task code.

Furthermore, control register 14a ensures that DIO can occur only while the Communications Processor Halt bit is set. In other words, because of the interlock that allows DIO during reset but at no other time, the only state of adapter 10b in which memory 15b may be directly written to is during Halt. When adapter 10b is not in a Halt set state, and task code is to be downloaded, the operating system of communications processor 13 obtains a pointer to the task code so that the task code can be copied to local memory 15b. This memory management aspect of the invention is described below in connection with FIGS. 3-6.

Status Register and Window Mapping Registers

Another aspect of the invention is a memory management control process that protects memory 15b from unauthorized access by downloaded user task code. This memory management control process involves the use of two hardware devices referred to above: status register 13a and window mapping registers of memory 15.

Referring to FIG. 1, a status register 13a of communications processor 13 controls the user mode. Status register 13a has an input bit that may be set on or off. Once in user mode, the only way to return to a supervisor mode is through a hardware or software interrupt. A user task cannot reset the user bit. In user mode, all interrupts are enabled. Instructions that operate on the status register are constrained so that they cannot reset the user mode bit and the interrupt mask bits.

The user mode controls access by communications processor 13 to memory 15b during run time. More specifically, in the user mode, communications processor 13 has no access to certain areas of memory space, and has access to other areas only indirectly via a special window mapping process.

Figure 3A:
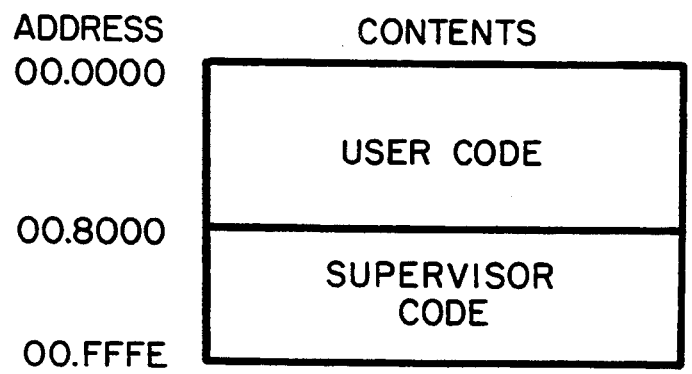
FIGS. 3a and 3b illustrate the virtual memory addresses of the communications processor shown in FIG. 1 and associated mapping registers.
Figure 3B:
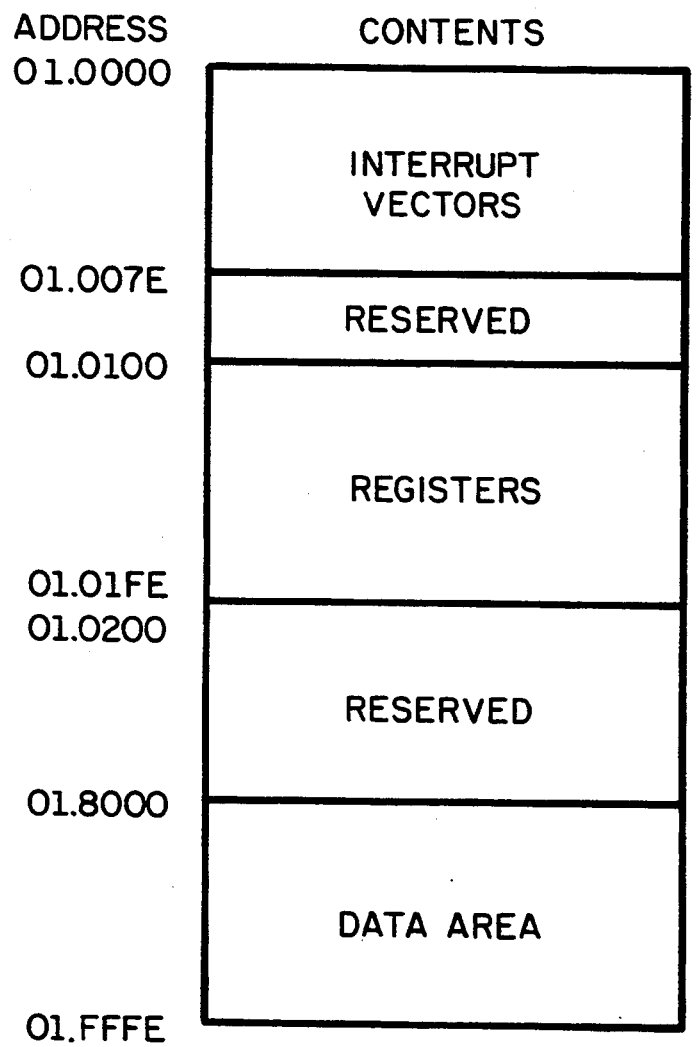
Figure 4:
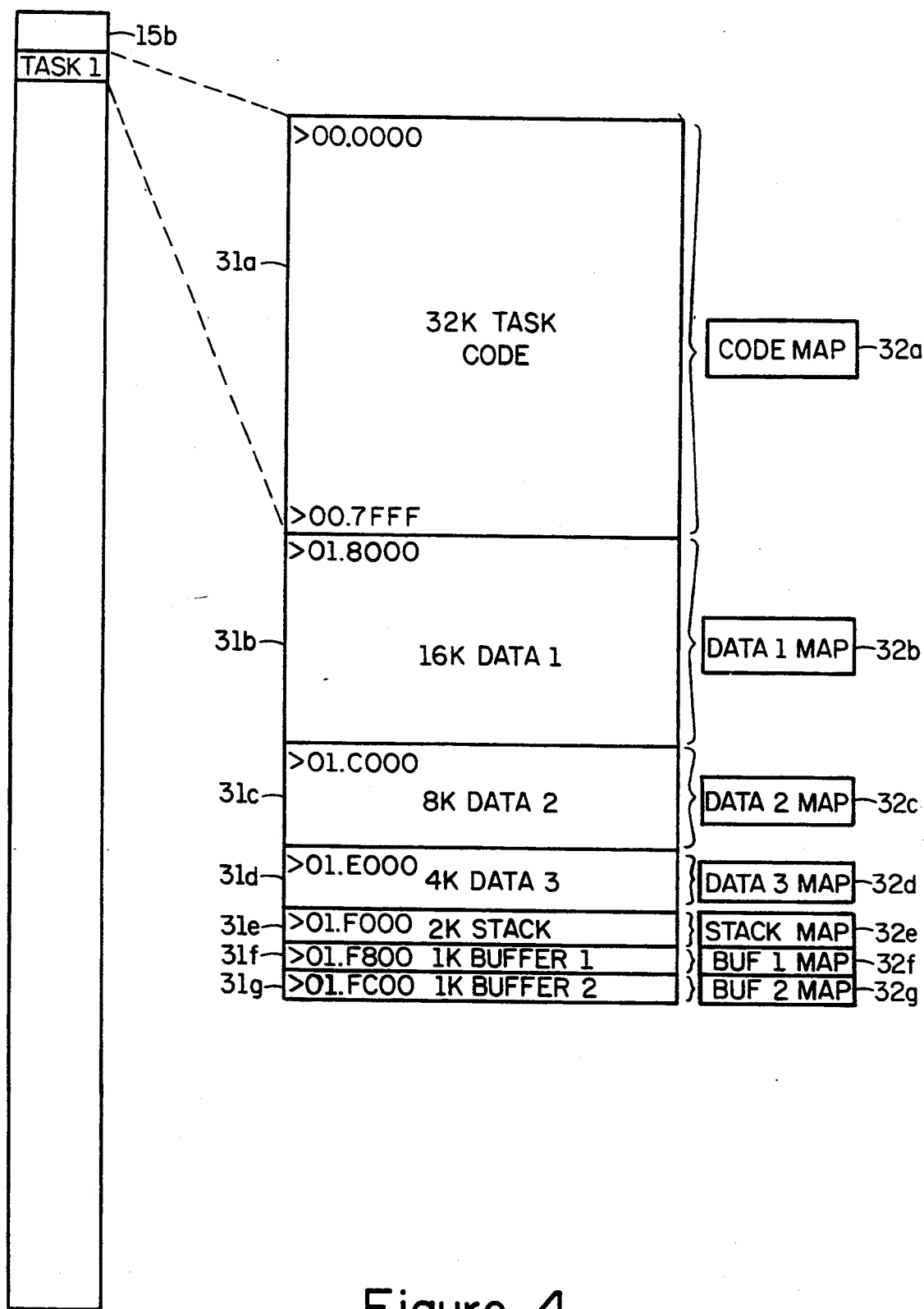
FIG. 4 illustrates memory windows, which are used to map virtual addresses shown in FIGS. 3a and 3b to real addresses.

FIGS. 3–4 illustrate the virtual memory maps of memory 15 from two different perspectives. FIGS. 3a and 3b illustrate the virtual memory seen by communications processor 13. FIG. 4 illustrates the virtual memory that is mapped to real addresses. As discussed above in connection with FIG. 1, memory 15 of adapter 10b has an extended real address range, to which the virtual addresses may be mapped. For example, the memory mapping permits memory 15b, which has 2 Mbytes, to be divided into 32 chapters of 64 Kbytes. Again, the size of memory 15b described herein is illustrative only. Other memory sizes could be used, with the essential feature of memory 15b being the ability to map to the registers described below.

Addresses used by communications processor 13 are specified in the general form XX.YYYY. The first value, XX, is a hexidecimal number in the range of 0 to 1F, representing a chapter number. The second value, YYYY, is a hexidecimal number in the range from 0 to FFFF, representing a byte address.

Referring to FIG. 3a, the virtual addresses of the Chapter 0 memory map are for code accesses. The lower area of Chapter 0, i.e., the area from 00.0000 to 00.7FFE, is for task code. The upper area, i.e., the area from 00.8000 to 00.FFFE, is reserved for supervisor code, with power up beginning with a code fetch.

Referring to FIG. 3b, the virtual addresses of the Chapter 1 memory map are for data accesses. The lower area, i.e., the first 32 Kbytes are for essential data. For example, the first 64 bytes are reserved for interrupt vectors. Internal registers are located from 01.0100 to 01.01FE. Other essential data, such as an address checker or operating system data is at 01.0200 to 01.8000. The rest of Chapter 1, i.e., the upper area, is for nonessential data, in particular, data used by user tasks.

The allocations of Chapter 0 and Chapter 1 are illustrative only, and other code or data may be stored in either Chapter. Chapters 2 through 32 (not shown) are used to store either code or data.

FIG. 4 illustrates the virtual memory areas of FIGS. 3a and 3b that are mapped to real memory. These mapped areas are the only areas available to a user task running on communications processor 13. Comparison of FIGS. 3a and 3b to FIG. 4 shows that not all virtual addresses are mapped. Specifically, for the upper area of Chapter 0 and the lower area of Chapter 1, the virtual addresses are the same as the real addresses.

Referring again to FIG. 4, seven windows 31a–31g are mapped to memory 15b. The lower half of this memory map is designated as a task code window. It should be understood that user task code is not limited to the size of the window, but rather access to the task code at any one time is limited by the range of the window. The upper half of the memory map is designated for six data windows. Of these six data windows, there are three general data windows 31b–31d, sized 16K, 8K, and 4K, a 2K stack window 31e, and two 1K buffer windows 31f and 31g.

FIG. 4 also illustrates a number of mapping registers 32a–32g, each associated with a memory window. These mapping registers 32a–32g implement an window mapping process by generating the real addresses. By accessing mapping registers 32a–32g, communications processor 13 can indirectly access code or data in any of the 32 chapters of memory 15b. Code can be executed from any chapter through use of the task code window 31a. Mapping registers 32a–32g are part of memory interface 15a.

Referring again to FIG. 3a, mapping registers 32a–32g are in the lower area of Chapter 1 virtual memory. Thus, registers 32a–32g are considered part of the essential operating data. The window memory mapping process of the invention ensures that only communications processor 13 is permitted, via its operating system, to access registers 32a–32g. In other words, mapping registers 32a–32g cannot be accessed by a user task. The user task must request a window mapping process, which is executed by communications processor 13 to perform the mapping.

Figure 5:
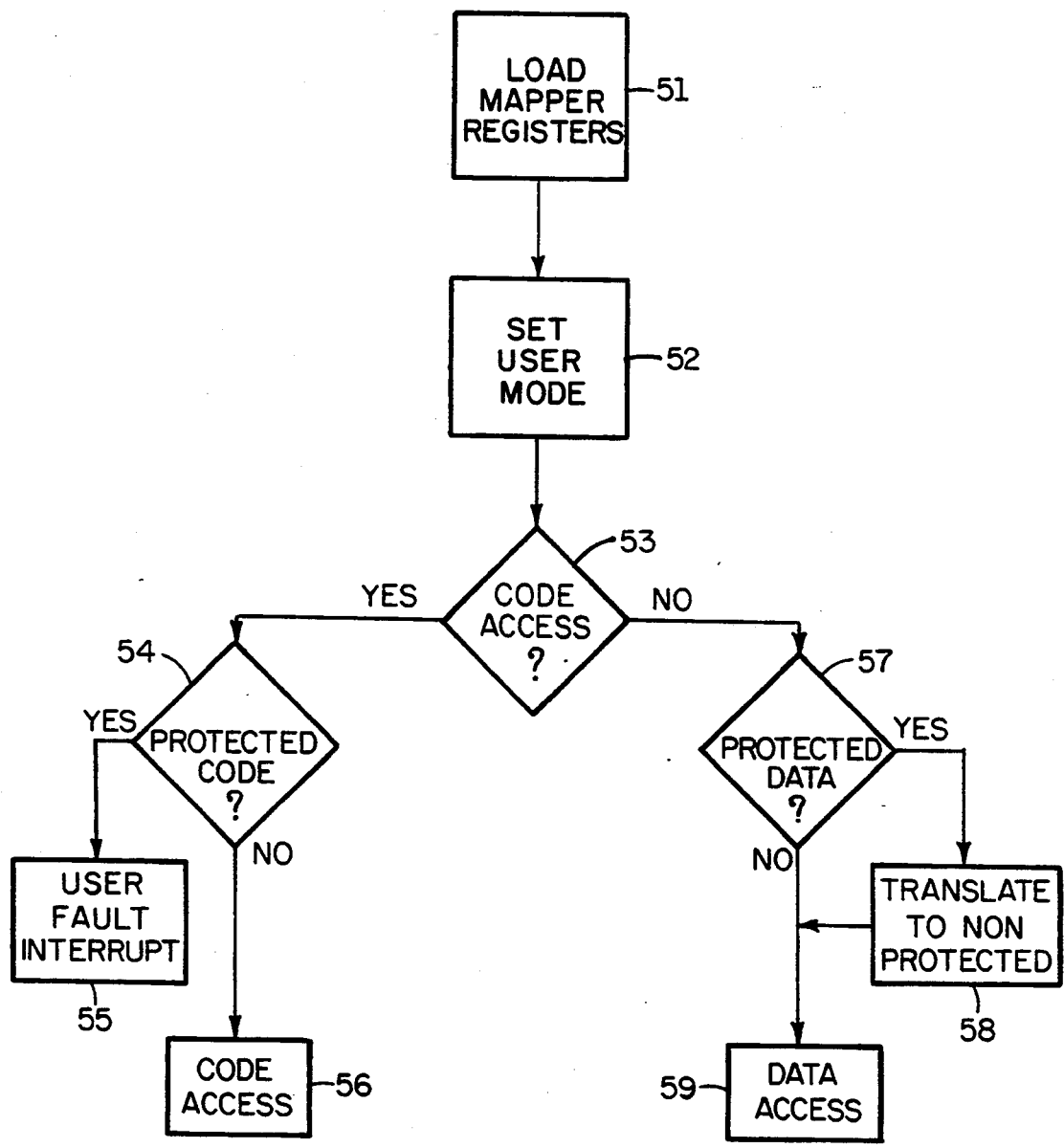
FIG. 5 is a process flow diagram of the window mapping process implemented by the mapping registers shown in FIG. 4.

FIG. 5 illustrates another aspect of the invention: a memory management process that protects adapter 10b from memory access by unfriendly user code. A user mode ensures that task code accesses to memory are always either to a window or generate a user fault. If to a window, the window mapping process translates a virtual address to a real address in the extended memory of adapter 10b. The value for the new address is generated from the virtual address and from a value stored in the register associated with the window. The window mapping process prevents a user task from accessing memory 15b directly. Instead, a user task may access memory only under control of communications processor 13 and its operating system.

In connection with FIG. 5, it is assumed that adapter 10b is initialized with its operating system. It is also assumed that any task code to be downloaded is compiled in a manner consistent with the memory map of FIGS. 3a and 3b, so that communications processor 13 is provided with virtual addresses. These operations may be accomplished with well known software development and operating system techniques. Prior initialization and downloading may be in accordance with the method of FIG. 2.

Step 51 of the memory management process is loading the mapping registers 32a–32g. These registers are loaded with an appropriate address in real memory 15b. As explained above in connection with FIG. 2, the operating system creates a task control block that stores the real addresses for a downloaded user task. Thus, for example, if a call is for the fifth page of a chapter of user task code, the fifth entry in the array of the task control block is written into the code map register. Communications processor 13 then jumps to the address specified in the call.

Step 52 is setting adapter 10b in a user mode. As explained above, the user mode enables all interrupts and ensures that the user mode configuration cannot be changed by a user task. When adapter 10b is in the user mode, all memory access is via mapping registers 32a–32g. The operating system controls the mapping of window addresses to real addresses, and therefore controls whether task code may access real memory.

Step 53 is detecting whether a request for memory access by the task code is to code space or to data space. When communications processor 13 is in user mode, it cannot access the upper half of its code space. Nor can communications processor 13 access the lower half of its data space. These memory spaces are "protected" in that privileged code and essential data are not accessible to the communications task when adapter 10b is in the user mode.

Consistent with the determination made in step 53, and as indicated by steps 54–56, if communications processor 13 attempts to access the upper half of Chapter 0, the access is allowed, but a hardware fault interrupt is generated, thereby stopping task code execution. This state is considered a user fault resulting from an attempt by a user task to access unauthorized memory. If the access is to the lower half of Chapter 0, the mapping process permits indirect access.

As indicated by steps 57–59, if communications processor 13 attempts to access the lower half of its data space, the upper half is automatically accessed. This may be accomplished by OR'ing a one into the ms bit of the data address. In this manner, the address is always to a data window. A window mapping process then permits access to memory 15b indirectly. This prevents a user task from accessing an unauthorized location, which could cause interference with registers, interrupt vectors, and data tables.

FIGS. 6a–6g illustrate, for each mapping register 32a32g, an example of address generation performed in steps 56 and 59 of FIG. 5. In general, the mapping registers are used to substitute the most significant (ms) bits of the address output by communications processor 13 with the same number of bits stored in the mapper register. In this manner, the least significant (ls) bits are provided by the virtual address of communications processor 13 and the most significant bits are provided by the mapping register. This address is then used to perform the real memory access.

Figure 6A:
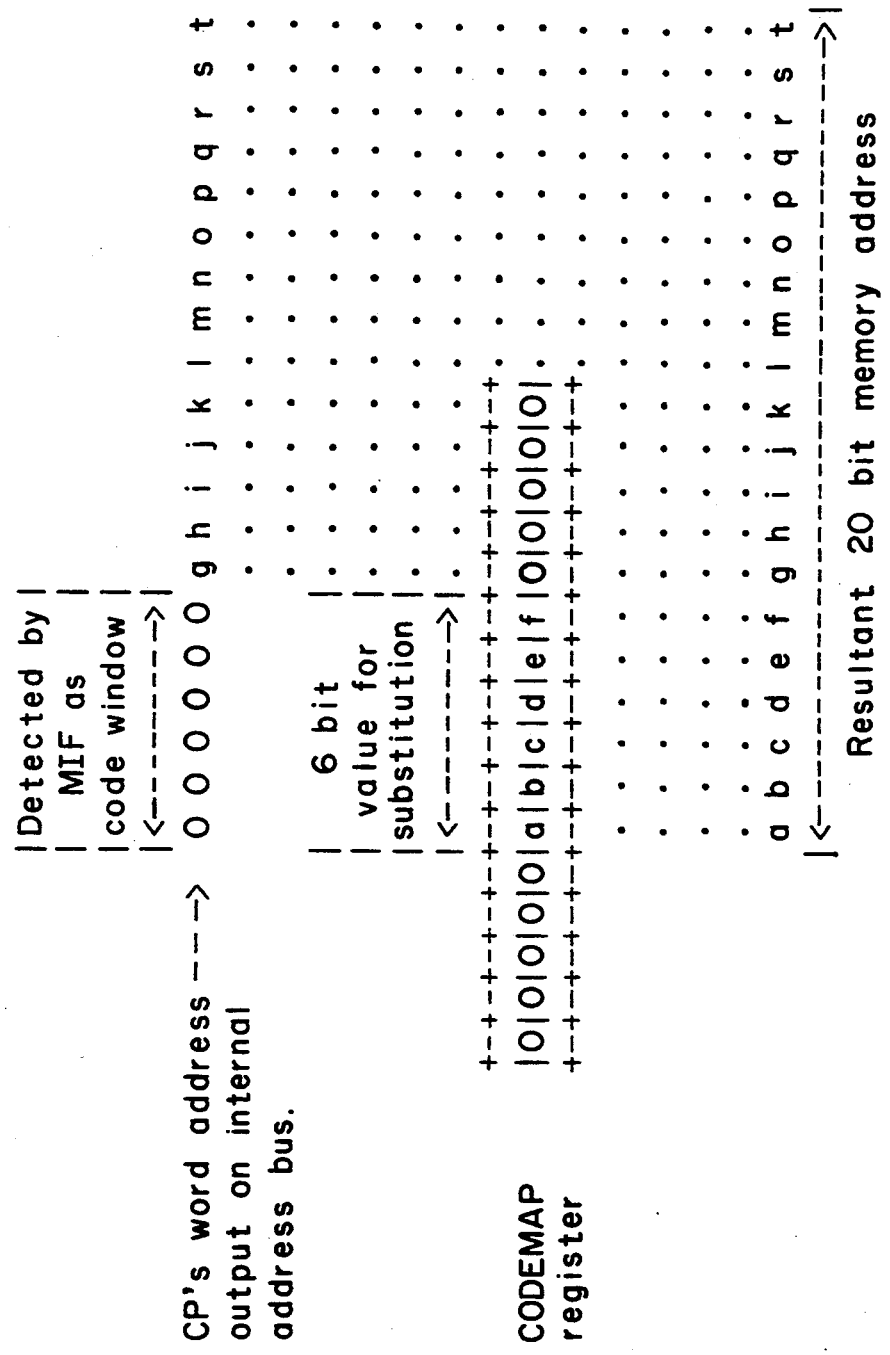
Figure 6C:
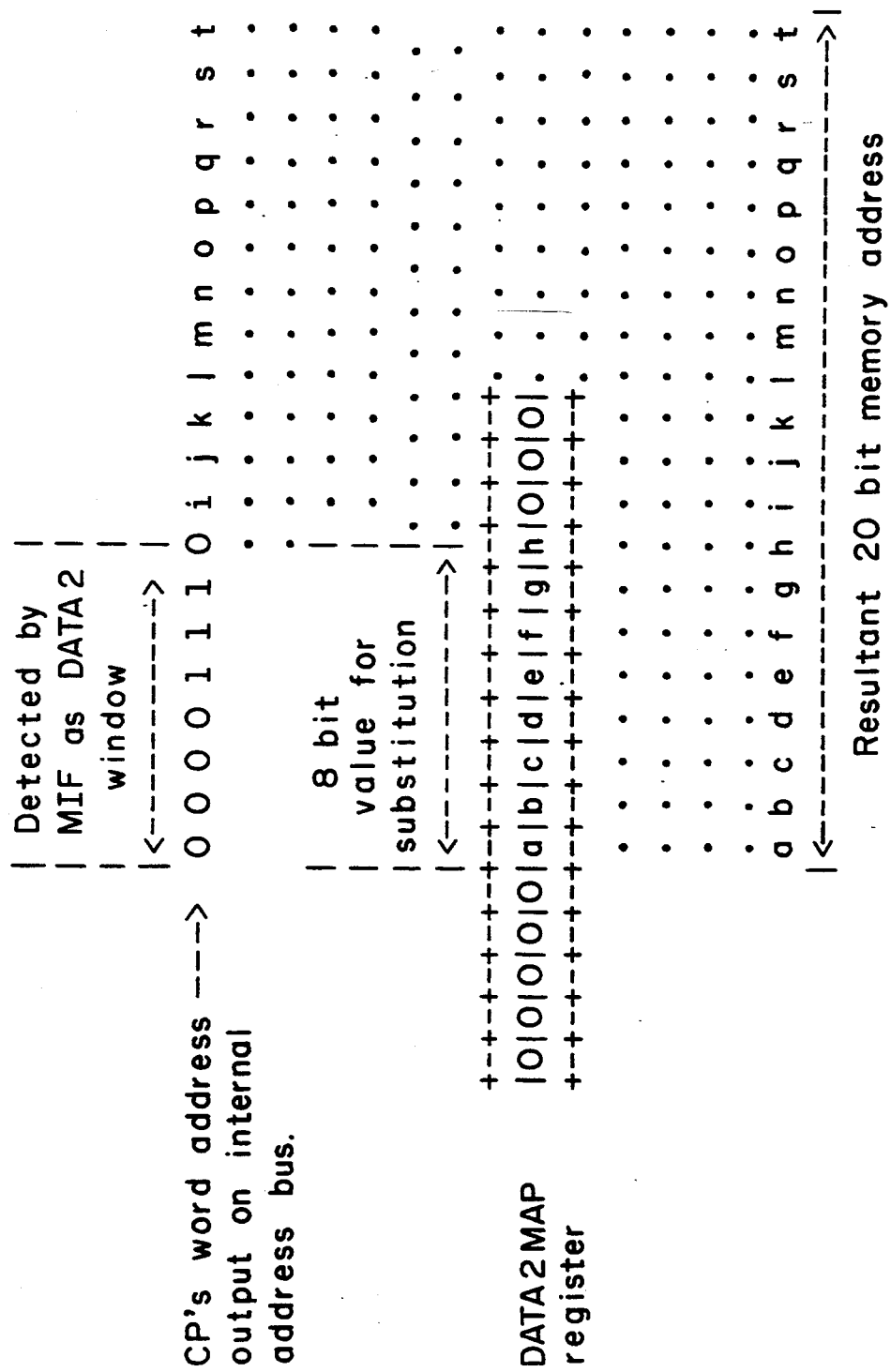
Figure 6D:
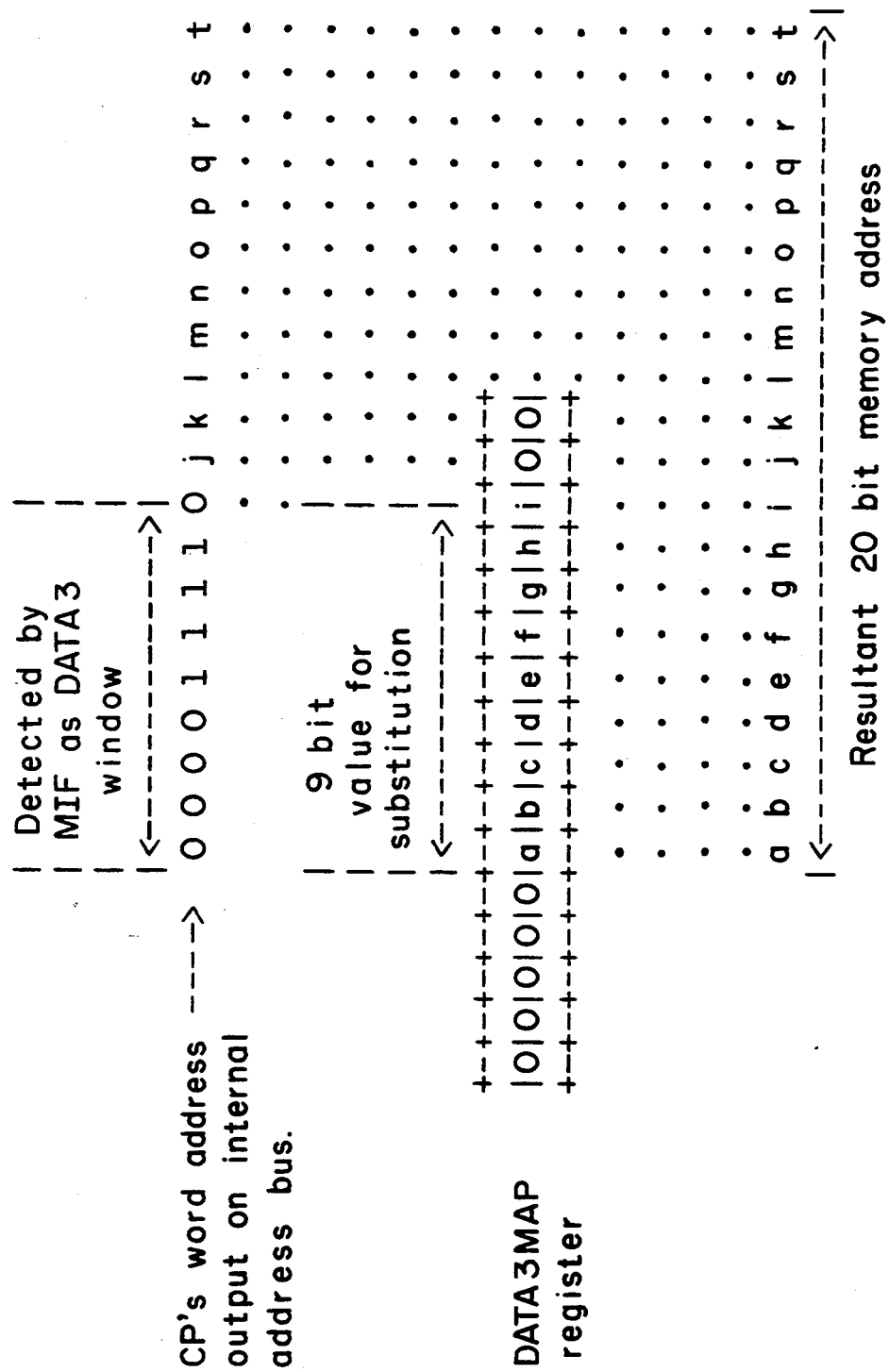
Figure 6F:
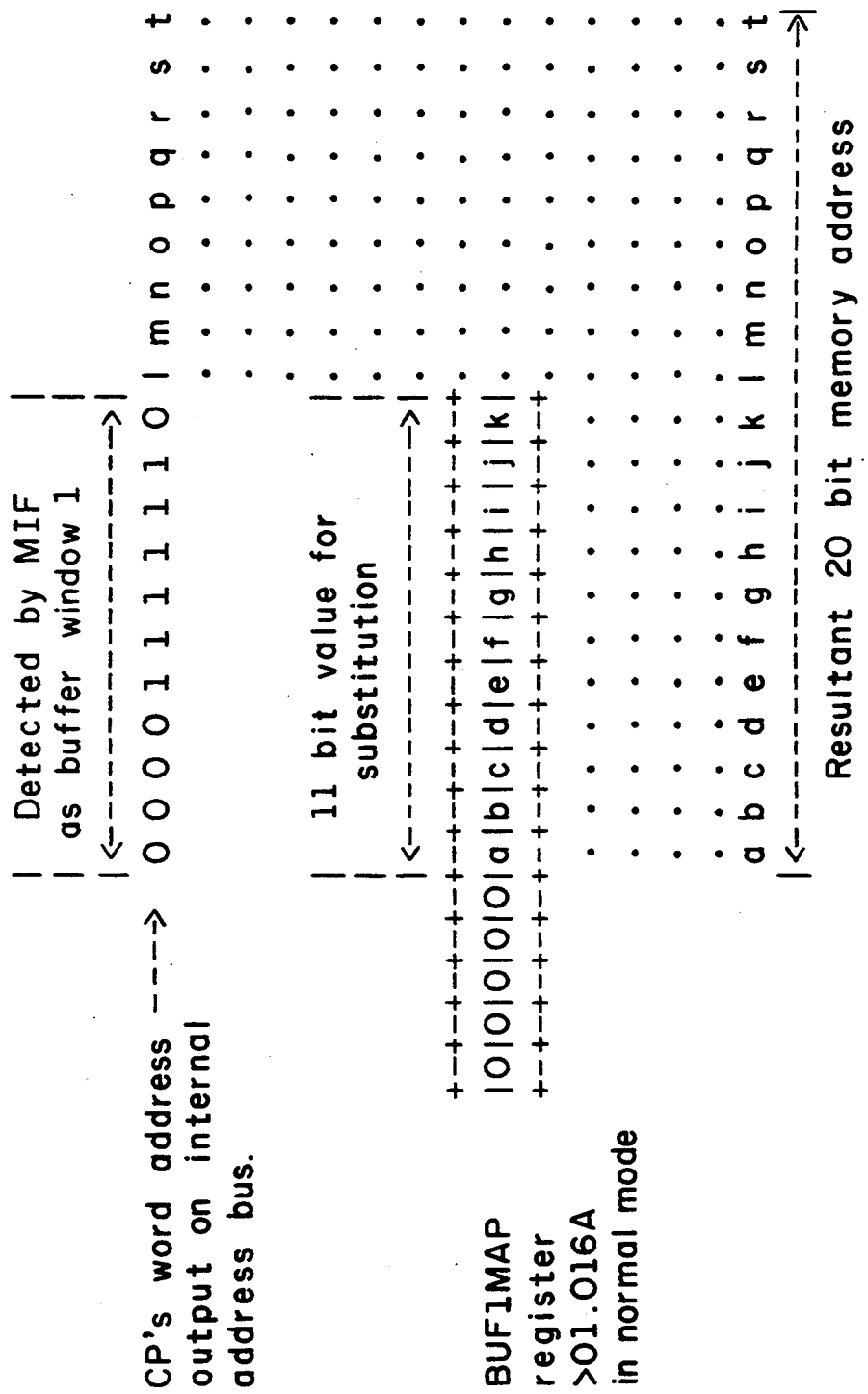
Figure 6G:
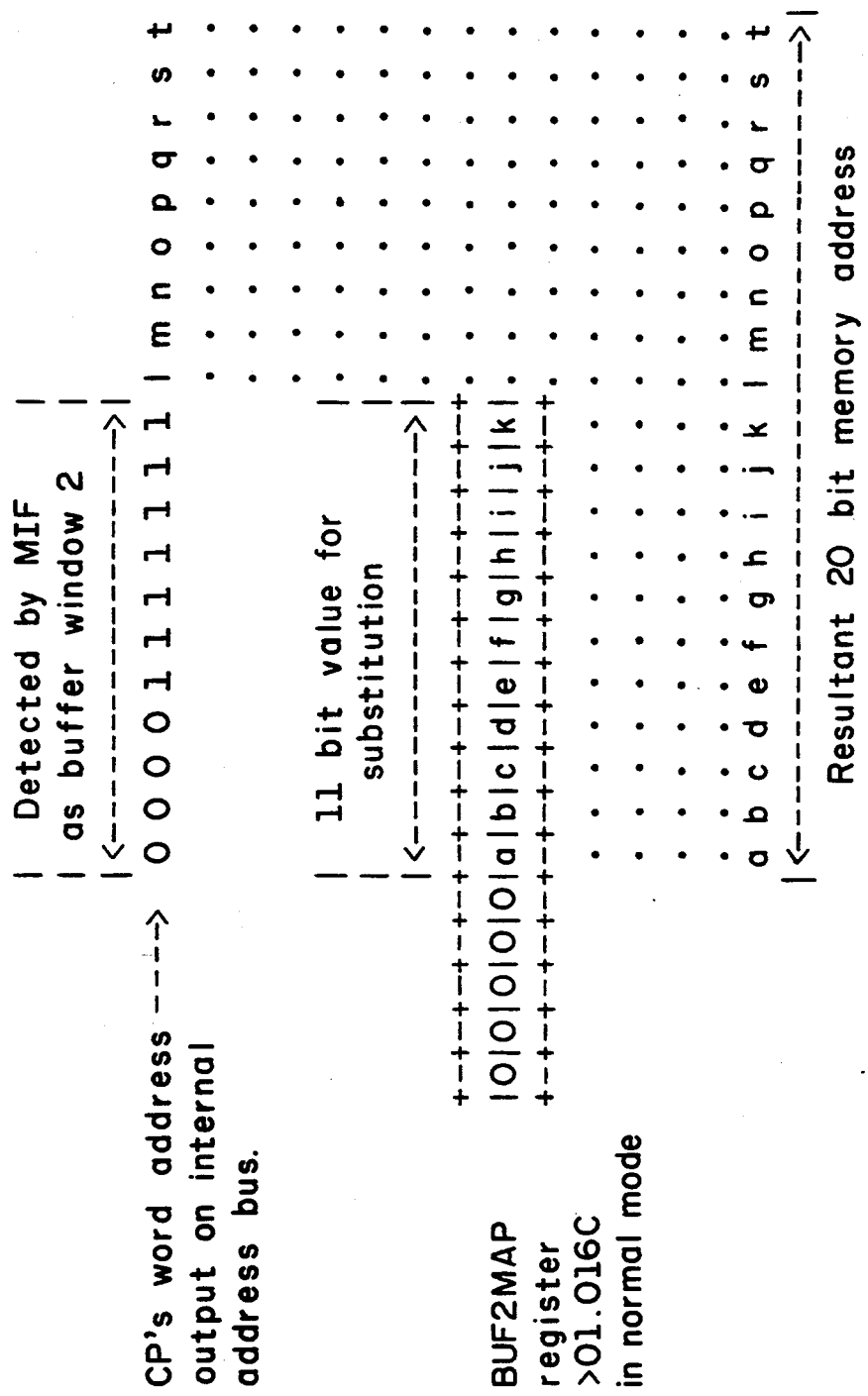

FIG. 6a illustrates the address translation for the task code window 31a, which is associated with mapping register 32a, CODEMAP. Each user task has whatever code space is provided by this window, from which code is executed. In the particular implementation described herein, the task code window is a Chapter 0 window and falls within the range 0000 to 7FFF, i.e., the lower 32 Kbytes of code space. If communications processor 13 accesses code in this space, a new address is generated from the value stored in CODEMAP. More specifically, the fourteen least significant bits of the original word address are combined with bits 5–10 of CODEMAP. Bits 5–9 of CODEMAP indicate a chapter number.

FIGS. 6b–6g illustrate address translations for data windows 31b–31g, which are also each associated with a respective mapping register 32b–32g. The corresponding mapping registers are DATA1MAP, DATA2MAP, DATA3MAP, STACKMAP, BUF1MAP, and BUF2MAP. In general, the data windows are for accessing task data tables, the stack window for stack operations, and the buffer windows for operations on buffers.

Referring now to FIGS. 6b–6g, when using registers 32b–32g, the new address is created from the window address and from register input. When communications processor 13 performs a data transfer within one of these window addresses range, memory interface 15a recognizes this and substitutes the n most significant bits of the window address with n bits from the corresponding register. The resulting address is then output on adapter bus 18 for the data transfer to or from memory 15b.

As stated above, the operating system of adapter 10b implements the memory management functions. It also permits a multiprogramming environment, in which, as each user task is dispatched, the operation system sets the context, in particular, by loading memory mapping registers 32a–32g. Consistent with the memory management process described above and this task-to-task operating environment, the operating system includes various routines to transfer information from one task to another.

The following examples are of two such routines, Enqueue and Dequeue, which are used when a user task communicates with another user task or with host system 10a. Enqueue is used to send information and Dequeue is used to receive the information. They have the following functions and parameters:

---

De_Queue (. . .)
    Required parameters: link_id
    Return parameters: completion_code, chain_length,
        user_parameter
This routine removes the chain at the top of the link
represented by link_id and places it on the task edit queue.
The first buffer of the chain is mapped into a buffer window.
The routine returns completion code, the length of the
dequeued chain in buffers, and user_parameter, which is used
for command or status information.
En_Queue (. . .)
    Required parameters: link_id, state, event_id,
        user_parameter
    Returned parameters: completion_code
This routine places the chain in the task edit queue onto the
end of queue link_id. Event_id associates an event with this
chain. State defines when the event should be raised.
User_parameter is for command or status information.

---

In the above description, an event is a parameter used by the operating system to inform a task that a requested activity has occurred. Events permit several tasks to co-exist and inform other tasks of data or command information, but not tie up communications processor 13 while waiting for another task to complete.

Links are the mechanisms that support task to task communications. Links provide a one way flow of information from one task to another, but can also provide status and acknowledgement in the opposite direction. The link_id identifies a physical location used by the sending task to properly direct data to the receiving task. The data structure used by the operating system to implement a link is the queue. One task of a link acts as the enqueue task, while the other process acts as the dequeue task for that link. Links consist of queues, where a queue is a linked list of data buffers or chains that contain the data being transferred by the link. The linked list contains a single unit of data, e.g., a frame or command.

To create a link between itself and another task, a task must make an open_link service request to the operating system. To do this, the task passes receiving and transmitting task_id's and an event_id to the operating system. The operating system then creates a service request event to the remote task.

As a result of the enqueue and dequeue routines, the sending and receiving tasks cannot access the same memory at the same time. During enqueue, the operating system removes the contents of the sending task's BUF*MAP 32f or 32g and places in a queue for the receiving task. The contents of BUF*MAP represents the address of the information to be transferred. The operating system then equates the contents of the sending task's BUF*MAP to one of that task's DATA*-MAP registers 32a–32d. As a result, the sending task can no longer access its buffer, and its BUF*MAP register points to the sending task's own data space. During the dequeue routine, the operating system controls mapping registers 32a–32g and the associated windows 31a–31g. The operating system dequeues the buffer address information and places it in a BUF*MAP register 32f or 32g of the receiving task. This permits the receiving task to access associated data in the buffer window.

The overall effect of the window mapping process ensures that a user task cannot access memory except through its window, which is controlled by the operating system. If data is to be sent from one user task to another, the sending user task releases access to the transmitted data, which is associated with a buffer window.

Other Embodiments

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

What is claimed is:

1. A communications processor system that provides data communication services for a host processor system so that it may communicate data as part of a network of processors, and that accepts the data and downloaded programming from the host processor system via a host bus, comprising:
    a communications processor for executing said downloaded programming and for receiving the data to be communicated, according to instructions of said downloaded programming, from the host system to the rest of the network, said communications processor having a status register for providing a status bit;
    a memory for storing said downloaded programming, said memory having protected space which may not be accessed when controlled by said status bit;
    a host system interface in data communication with the host processor and with said communications processor by means of the host bus, and having a control register connected to said communications processor and accessible by said host processor system, wherein said control register has a reset bit for controlling whether said communications processor in a reset state during which said host processor system is temporarily not able to communicate with the rest of the network, and wherein said control register has a control bit for controlling whether said communications processor is in a halt state during which direct access to said memory may occur;
    an internal bus for providing data communications between said communications processor, said host interface, and said memory; and
    a network interface in communication with said communications processor for receiving data from said communications processor and for delivering said data to said network.

2. The communications processor system of claim 1, further comprising a memory interface for providing direct memory access from said host system interface to said memory.

3. The communications processor system of claim 1, and further comprising a memory interface with at least one memory mapping register, accessible by said communications processor for mapping addresses for downloaded user code to a user space of said memory.

4. A method of downloading code to a communications processor system, where both the host system and the communications processor system are a node in a data communications network and where the host processor provides input to the communications processor system via a control register in an interface accessible to both processors, comprising the steps of:
    setting a reset bit of the control register to place said communications processor in a reset state, such that said communications processor is not in communication with the rest of the network;
    only while said communications processor is in said reset state, setting a halt bit of said control register to place said communications processor in a halt state, such that execution of communications tasks by said communications processor system are halted;
    downloading operating system code to memory of said communications processor system from said host processor system; and
    changing the state of said reset bit and said halt bit to remove said communications processor system from said reset state and from said halt state;
    wherein each of said steps is performed by said host processor.

5. The method of claim 4, further comprising the steps of delivering input to said communications processor while it is not in said reset state or in said halt state, such that it is in a user state in which it may access only certain areas of its memory, and of using said communications processor to download user task code to those areas of memory.

6. The method of claim 4, wherein said step of downloading operating system code is by means of direct I/O memory access.

7. The method of claim 5, wherein the step of downloading communications task code is by means of direct memory access to memory of said host processor by said communications processor.

8. A method of downloading user task code from a host processor to a communications processor system, such that access to protected areas of memory of the communications processor system, which are reserved for its supervisor code or supervisor data, is prevented, comprising the steps of:

using a status register of the communications processor system to set a status bit to a user state, during which the following steps occur:

using the host processor to deliver to said communications processor system a virtual memory address;

using the communications processor to determine whether said virtual address is to protected areas of memory reserved for supervisor code;

if said request is to protected memory space reserved for supervisor code, using said communications processor to prohibit said access by generating an interrupt;

if said request is not to protected memory space, using said communications processor to map said virtual address to a real memory address of said communications processor system;

downloading said user task code to said real memory address via direct memory access of said host processor memory by said communications processor.

9. The method of claim 8, wherein said step of using said communications processor to map virtual addresses is performed by accessing a mapping register that stores real address bits.

10. The method of claim 9, wherein said step of using said communications processor to map virtual addresses comprises substituting a portion of said real address bits for bits representing said virtual address.

11. The method of claim 8, further comprising the step of using said communications processor to determine whether said virtual address is the same as an address of protected memory space reserved for supervisor data, and if said request is to such memory space, prohibiting said access by changing said virtual address to an address of other data memory space.

12. The method of claim 8, further comprising the step of using the host processor to generate an interrupt after said code has been downloaded, such that said status bit is set to a supervisor state during which said communications processor may access said protected memory space.

13. The communications processor system of claim 1, wherein said memory further includes user space that is divided into code subspace and data subspace, each subspace associated with at least one address mapping register.

14. The communications processor system of claim 1, wherein said supervisor space is divided into code subspace and data subspace.

* * * * *